May 28, 1946. C. W. KANDLE 2,401,250
EARTH DRILL
Filed Sept. 30, 1943 2 Sheets-Sheet 1

Charles W. Kandle
INVENTOR.

BY
ATTORNEY.

May 28, 1946.  C. W. KANDLE  2,401,250
EARTH DRILL
Filed Sept. 30, 1943  2 Sheets-Sheet 2

Charles W. Kandle
INVENTOR.

BY *[signature]*
ATTORNEY.

Patented May 28, 1946

2,401,250

UNITED STATES PATENT OFFICE 2,401,250

EARTH DRILL

Charles W. Kandle, Chicago, Ill.

Application September 30, 1943, Serial No. 504,343

14 Claims. (Cl. 255—70)

This invention relates to earth drills and more particularly to drill bits and cutting blades adapted to be employed at the bottom of auger flights and the like for the boring of holes in the earth similar to the drills set forth in United States Patent No. 2,320,612 granted to applicant.

One of the objects of the present invention is to provide a simple blade construction that permits ready replacement of the cutting blade.

Another object is to provide a reversible blade with different cutting angles for different positions of the blade to promote efficient drilling in different types of soil.

Another object is to prevent clogging of the dirt immediately behind the blade and as it moves onto the flight.

Another object is to provide a more efficient trap door for the passage of dirt over the blade without danger of clogging.

Another object is to protect the outer corner of the blade from wear by providing an auxiliary cutter ahead of the blade to define the outer circumference of the cut.

Another object is to provide for quick adjustment for different depths of cut in accordance with the type of soil encountered.

Other objects will appear hereinafter in connection with the description of an embodiment of the invention illustrated in the accompanying drawings.

Figure 1:
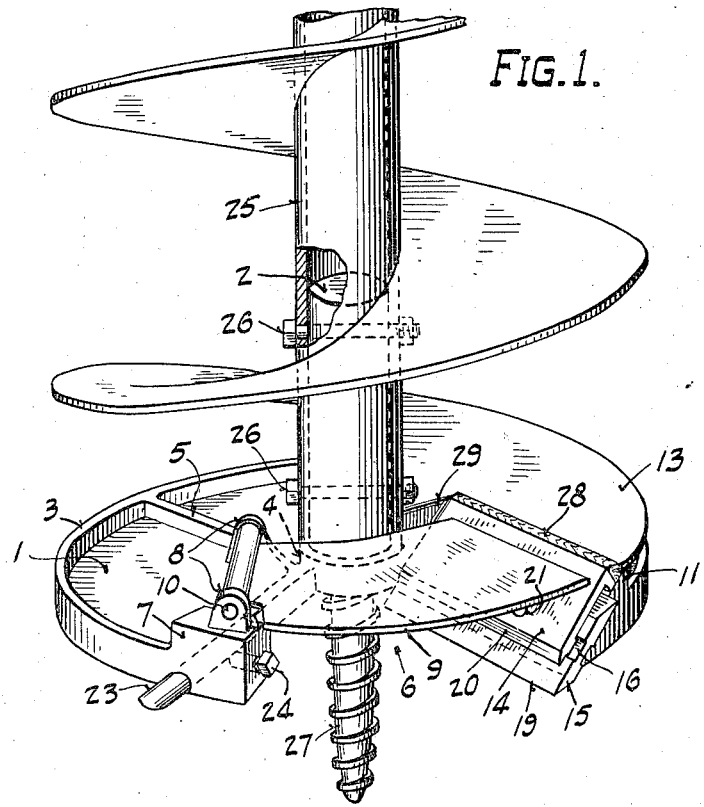
Figure 1 is a perspective view of the lower end of an auger drill having a bit and cutter embodying the invention.
Figure 2:
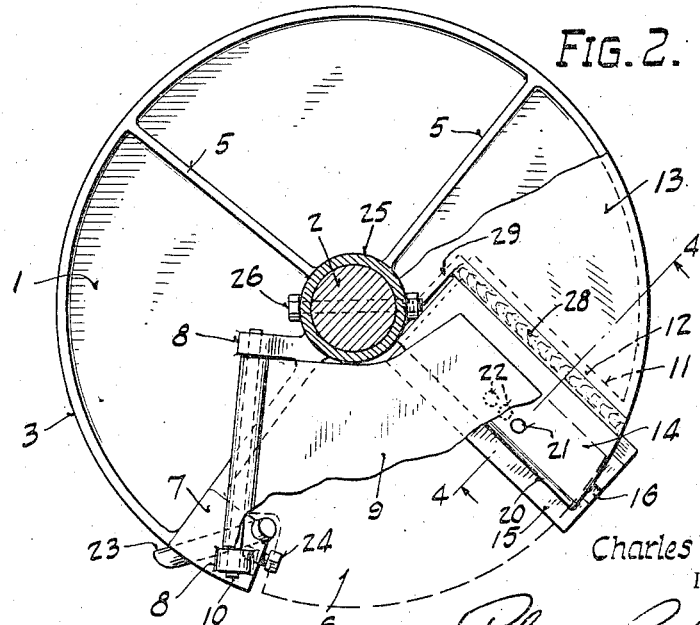
Fig. 2 is a top plan view of the bit.
Figure 3:
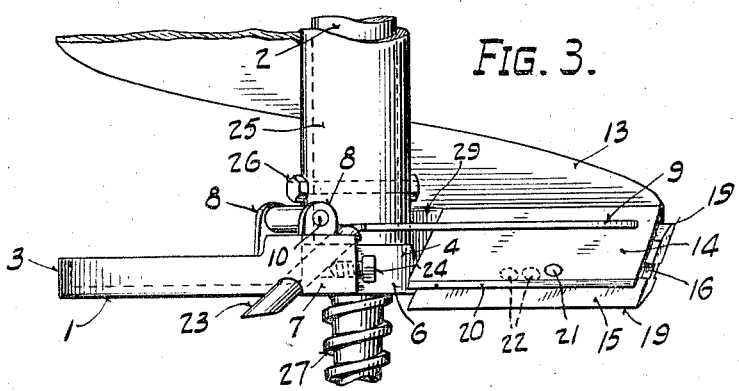
Fig. 3 is a side elevation of the bit showing the auxiliary cutter pin.
Figure 4:
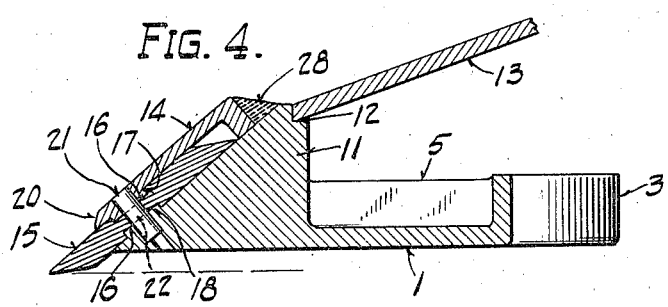
Fig. 4 is a section through the blade and blade holder taken on line 4—4 of Fig. 2.
Figure 5:
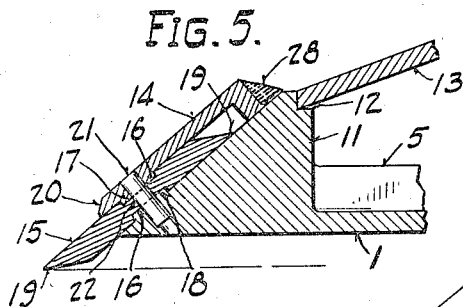
Fig. 5 is a section similar to Fig. 4 showing the blade reversed for making a deeper cut.
Figure 6:
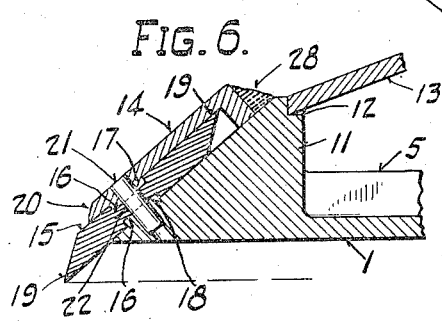
Fig. 6 is a similar section showing the blade turned over to provide a different cutting angle therefor.
Figure 7:
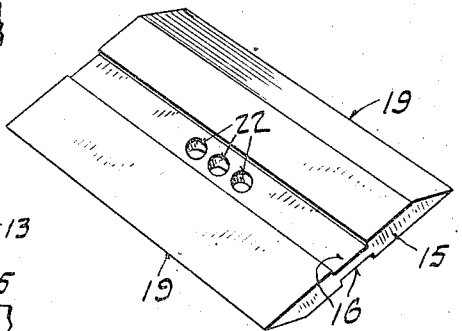
Fig. 7 is a perspective view of the blade when removed from its holder.

The drill bit comprises in general a cast metal circular plate 1 having a central upstanding cylindrical shank 2 and an outer rim 3. The plate 1 is relatively thin in the body portion between the central shoulder 4 encircling the shank 2 and the thick rim 3, and has radial spoke-like ribs 5 for strengthening the same.

The plate 1 is completely circular except for an open sector 6 preferably constituting less than one-quarter of the circumference and providing a space for receiving the cutting blade and for the upward movement of spoil over the blade.

An extra heavy radial rib 7 borders the forward boundary of sector 6 and contains hinge brackets 8 for receiving and holding a trap door 9 covering the open sector 6. The hinge joint or pivot 10 is located relatively high above the plate 1 and nearly midway between the top of the plate and the first flight convolution of the conveyor 13 to facilitate the upward swinging of door 9 without interference from the auger.

An extra heavy radial rib 11 borders the rear boundary of sector 6 and has a shoulder 12 along its rear side for receiving the lower end of the conveyor flight 13. The forward side of the rib 11 is slanted at about a 40° angle from the horizontal in order to give pitch to the cutting blade.

A blade holder 14 is welded to the top of rib 11 and extends downwardly over the slanting face of the rib and in spaced parallel relation thereto for receiving the blade 15 therebetween.

The blade 15 has a channel or groove 16 in each face for registering with a tongue 17 in holder 14. As shown the grooves 16 are directly opposite one another in the respective faces of blade 15 so that the blade may be turned over without changing the position of its cutting edge. If desired, a tongue 18 may be provided on the face of rib 11 and directly opposed to tongue 17.

The blade has its edges beveled bluntly to constitute cutting edges 19. Where both sides are beveled, the bevel on one side should be steeper than that on the other side of each edge. One cutting edge is preferably disposed at a farther distance from the grooves 16 than the other cutting edge. This provides for a reversal of the blade to obtain either a deep cut in light soils or a shallow cut in heavy soils. If the blade is merely turned over without reversing the same edge for edge, the angle of the cutting edge is changed to suit the soil. It is possible that more than two cutting depths may be provided for if one of the tongues 17 or 18 is eliminated and the grooves 16 are offset laterally from one another so that one is at the center line of the blade and the other is to one side thereof. Both grooves may be disposed at the center line of the blade.

The length of the beveled surface on rib 11 and of holder 14 is such as to provide a recess for receiving the blade and covering its unused edge while exposing the cutting edge at a depth of from about $\frac{1}{16}$ to $\frac{7}{16}$ inch below the bottom surface of plate 1.

The blade holder 14 has its front edge 20 beveled and extending to a position short of the shortest bevel on the blade to prevent spoil from getting beneath it and prying upwardly.

The position of the blade 15 radially with respect to the holder 14 and plate 1 is adjustable to provide that the blade extends outwardly beyond the rim 3, usually from about one-quarter to about one-half inch. The blade 15 may be held in adjusted radial position by a screw or pin 21 extending downwardly through holder 14 and into the blade. The blade preferably has several small holes 22 for receiving the screw 21 in the respective adjusted positions of the blade.

The blade is set a little behind the actual radius from the center of the bit so that it has a tendency to crowd the spoil inwardly toward the center as the spoil passes upwardly over the blade. The trap door 9 has the axis of its hinges nearly parallel to the rib 11 so that the door will rise freely until it engages the next convolution of the spiral flight 13 without interference from the central shank 2.

In order to prevent undesirable wear of the outer corner of blade 15, an auxiliary cutter in the form of a blunt nosed pin 23 is disposed in the outer corner of rib 7 and set at an angle to extend diagonally downwardly from plate 1 and outwardly from rim 3 a distance equal to or greater than the corresponding position for the outer corner of blade 15. The cutter 23 may be held in place by a set screw 24 extending from the back of rib 7. The relatively inexpensive cutter 23 serves to break up the soil at the outer edge of the bore ahead of the blade 15 and thereby prevent undue wear of the blade.

The bit is ordinarily secured to the lower end of an auger or conveyor flight 13 by entry of shank 2 into the central vertical tube 25 of the flight. Rotation of the bit with the flight is obtained by bolts 26 passing through the tube 25 and shank 2. A suitable central lead screw 27 may be provided for additionally centering the bit in the hole and keeping it from jumping up and down during drilling.

The flight 13 comprises a sheet metal spiral encircling the central tube 25 and edge welded thereto. The lower end of flight 13 has its edge cut to fit upon shoulder 12 just behind the top of the weld 28 of blade holder 14. The inner portion 29 of the lower edge of the flight is cut and bent downwardly to fill the gap between rib 11 and tube 25.

In drilling the spoil rises over blade 15 and holder 14 and falls immediately upon flight 13 where it is gradually pushed upwardly as more spoil begins to rise. By bringing the lower edge of the flight directly to the top of the rib 11 and holder 14, it has been found that there is no clogging of spoil at this point. Where the flight is dropped to rest upon plate 1, there is danger of clogging of spoil immediately behind rib 11, particularly in certain types of soil.

The various features of the invention may be differently embodied within the scope of the accompanying claims.

I claim:

1. In a bit of the class described, a blade support having a forwardly slanting surface for supporting a cutting blade generally radially of the bit, a blade holder integrally secured at its upper edge to said blade support and extending forwardly and downwardly parallel to said surface and spaced therefrom to provide a slot for receiving the cutting blade, and a double edged reversible cutting blade adapted to be inserted in said slot, said blade and said holder having a radially extending interlocking tongue and groove to secure the blade for insertion and removal endwise thereof with either edge free for cutting and with the other edge spaced from the rear closure of the slot.

2. In a bit of the class described, a blade support having a forwardly slanting surface for supporting a cutting blade generally radially of the bit, a blade holder integrally secured at its upper edge to said blade support and extending forwardly and downwardly parallel to said surface and spaced therefrom to provide a slot for receiving the cutting blade, and a double edged reversible cutting blade adapted to be inserted in said slot, said blade and said support having a radially extending interlocking tongue and groove to secure the blade for insertion and removal endwise thereof with either edge free for cutting and with the other edge spaced from the rear closure of the slot.

3. In a bit of the class described, for earth boring, a cutting blade and a holder for said blade to secure the same at a fixed angle with its free cutting edge generally radial of the bit and extending downwardly and forwardly to engage the soil, said blade having its cutting edge beveled only on one side and being adapted to be secured in place with either side up to provide a predetermined selected angle of inclination for the cutting edge for different soil conditions.

4. In a bit of the class described, for earth boring, a cutting blade disposed in a slanting slot in said bit with its free cutting edge generally radial of the bit and extending downwardly and forwardly to engage the soil, said blade having its cutting edge formed at different angles on opposite sides and being adapted to be inserted in said slot either side up to provide a predetermined selected angle of inclination for the cutting edge, and means for interlocking said blade and bit.

5. In a bit of the class described, for earth boring, a cutting blade disposed in a slanting slot in said bit with its free cutting edge generally radial of the bit and extending downwardly and forwardly to engage the soil, said blade having its cutting edge formed at different angles on opposite sides and being adapted to be inserted in said slot either side up to provide a predetermined selected angle of inclination for the cutting edge, and said blade and bit having interlocking shoulders operable in either position of the blade for securing the same in place.

6. In a bit of the class described, for earth boring, a double edge flat cutting blade having a longitudinal groove in each side between the longitudinal cutting edges and substantially parallel thereto for interlocking with the bit, at least one of said grooves being disposed off-center with respect to the center line of said blade to provide for different cutting depths for the respective blade edges upon the reversal of the blade.

7. In a bit of the class described, for earth boring, a double edge flat cutting blade having a longitudinal groove in each side substantially parallel to the cutting edges of the blade for interlocking with the bit, said grooves being disposed off-center with respect to the center line of said blade to provide for different cutting depths for the respective blade edges upon reversal of the blade, and said grooves being disposed opposite one another to provide for the turning over of said blade.

8. In a bit of the class described, for earth boring, a double edge flat cutting blade having its longitudinal cutting edges beveled to provide different cutting angles for the blade when reversed by turning the blade over in its holder and having a longitudinal groove in each side between the edges of the block for interlocking with the bit, said grooves being disposed opposite to one another to provide for the selective reversal of the blade.

9. In a bit of the class described, for earth boring, a circular horizontal plate having an open sector through which spoil rises over a slanting generally radially disposed cutting blade, a spiral conveyor flight disposed with its lower end edge adjacent the blade for receiving spoil therefrom, a central vertical support for said flight, a trap door covering said open sector and adapted to pivot upwardly on the spoil, and a hinge bracket on said plate for hinging said trap door thereto, said bracket providing the pivot line of said door at a level substantially above the top of said plate and in a direction substantially parallel to a radius near the center of said open sector thereby facilitating pivoting of the door free from interference by said central support.

10. In a bit of the class described, for earth boring, a circular bit having a cutting blade disposed generally radially thereof and an auxiliary cutting tooth constituting a rod adjustably secured at an angle in an opening in the bit forwardly of the blade and in circular line with the outer corner of the cutting edge of the blade to break the soil and protect the blade from excessive wear, said rod being adjustable outwardly to compensate for wear thereon.

11. In a rotary bit of the class described for earth boring, a disc-like blade support having a sector-like opening, the forwardly facing edge bounding said opening being of substantial thickness and having its face slanting upwardly toward the rear to support a cutting blade at an angle thereon, a blade holder extending parallel to the face of said edge and spaced above the same for receiving a cutting blade therebetween, a cutting blade disposed in said space and extending substantially radial of said support with its forward and downward edge disposed for cutting, and fixed interlocking shoulders between the blade and said holder to secure the blade against thrust forces and requiring the blade to be inserted and removed by endwise movement radially of the support, the top surface of the holder being substantially free from obstruction to the movement of dirt thereover.

12. In a rotary bit of the class described for earth boring, a disc-like blade support having a sector-like opening, the forwardly facing edge bounding said opening being of substantial thickness and having its face slanting upwardly toward the rear to support a cutting blade at an angle thereon, a blade holder extending parallel to the face of said edge and spaced above the same for receiving a cutting blade therebetween, a cutting blade disposed in said space and extending substantially radial of said support with its forward and downward edge disposed for cutting, and fixed interlocking shoulders between the blade and said holder to secure the blade against thrust forces and requiring the blade to be inserted and removed by endwise movement radially of the support, the top surface of the holder being substantially free from obstruction to the movement of dirt thereover, and a removable pin adapted to interlock the blade with said holder to prevent accidental displacement of the blade radially of the support.

13. In a rotary bit of the class described for earth boring, a disc-like blade support having a sector-like opening, the forwardly facing edge bounding said opening being of substantial thickness and having its face slanting upwardly toward the rear to support a cutting blade at an angle thereon, a blade holder extending parallel to the face of said edge and spaced above the same for receiving a cutting blade therebetween, a cutting blade disposed in said space and extending substantially radial of said support with its forward and downward edge disposed for cutting, and fixed interlocking shoulders between the blade and said support to secure the blade against thrust forces and requiring the blade to be inserted and removed by endwise movement radially of the support, the top surface of the holder being substantially free from obstruction to the movement of dirt thereover.

14. In a bit of the class described for earth boring, a flat cutting blade having its upper and lower edges shaped for cutting and adapted to be held with one of its cutting edges extending horizontally in a generally forward and downward direction, said blade having a longitudinal groove in at least one side intermediate and parallel to said cutting edges for interlocking the same with the bit to transmit thrust forces therebetween.

CHARLES W. KANDLE.